Nov. 29, 1932.   H. J. TURNER   1,889,713
FLYING MACHINE
Filed April 25, 1932   2 Sheets-Sheet 1
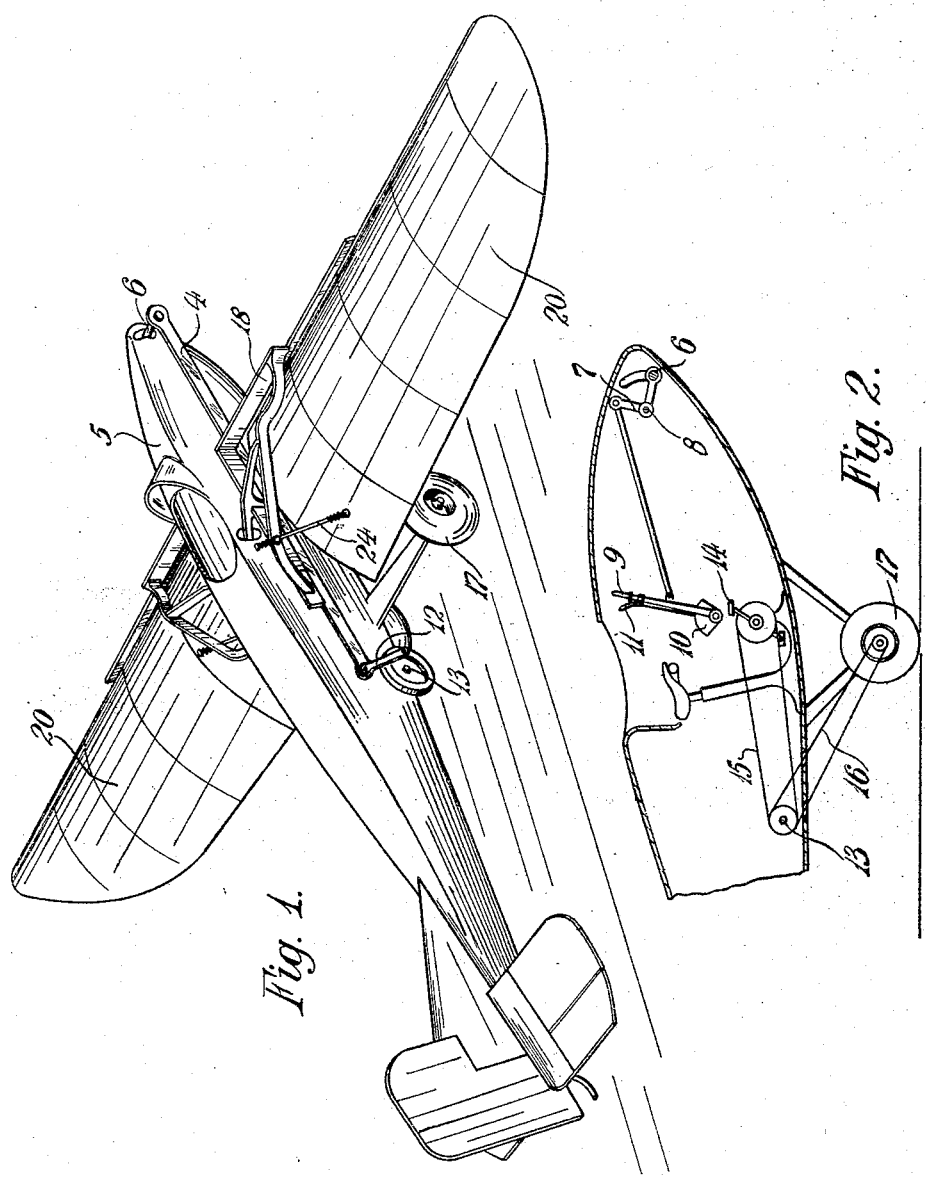

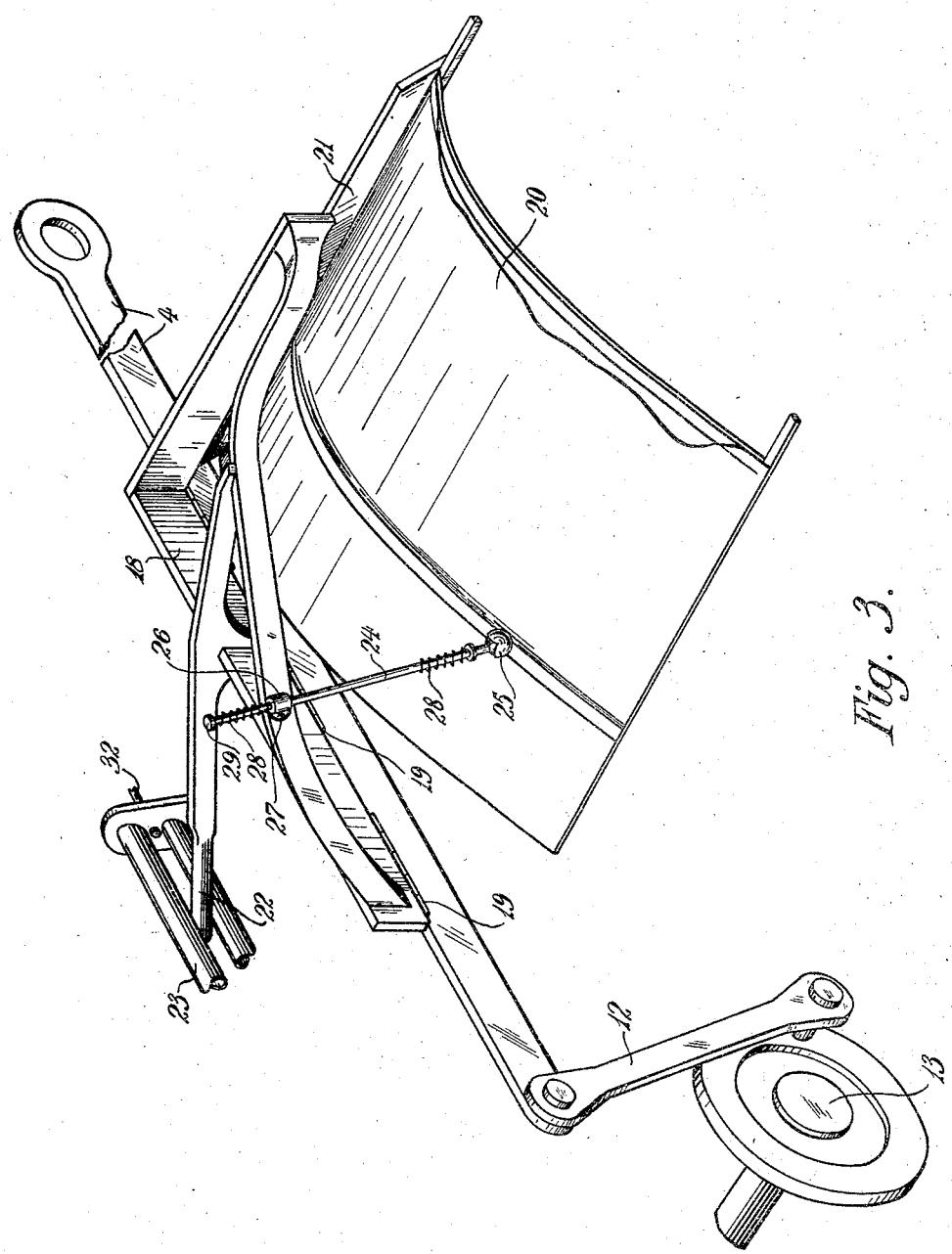

Patented Nov. 29, 1932

1,889,713

UNITED STATES PATENT OFFICE

HENRY JAMES TURNER, OF FOREST GATE, ENGLAND, ASSIGNOR OF ONE-HALF TO FREDERICK WILLIAM MATTISON, OF SEVEN KINGS, ESSEX, ENGLAND

FLYING MACHINE

Application filed April 25, 1932, Serial No. 607,467, and in Great Britain May 4, 1931.

This invention relates to flying machines of the ornithopter type, in which wings pivoted to a central fuselage are caused by manual or other power to reciprocate or vibrate in order to sustain and propel the machine through the air.

The invention provides an aircraft of the above type comprising in combination a fuselage, a rocking member (e. g. a beam, framework or the like) pivoted at its forward end to the fuselage on an axis extending transversely thereto, wings on opposite sides of the fuselage connected to the rocking member at points spaced away from and to the rear of the pivot and movable with respect to the rocking member about axes extending fore and aft of the aircraft, and means for oscillating the rocking member about its pivot.

According to a feature of the invention the wings may be connected to the rocking member by means of frames, which are attached to the rocking member by hinges extending fore and aft of the aircraft and to the wings by hinges extending transversely of the aircraft. The movement of the frames about their hinges may be limited by guides mounted on the fuselage and co-operating with extensions projecting inwardly from the frames, whilst the movement of the wings about their hinges may be limited by rods attached to the wings at points distant from the hinges and slidably mounted in guides secured to the frames.

The oscillating movement may be communicated to the rocking member by means of a pedal or motor operated crank which may, if desired, be geared to the landing wheels of the aircraft. According to a further feature of the invention the pivoted end of the rocking member may be movable up and down with respect to the fuselage for the purpose of enabling the pilot to alter the attitude of the wings with respect to the fuselage.

A practical embodiment will now be described with reference to the accompanying drawings in which:—

Figure 1 is a perspective view of an aircraft according to the invention.

Figure 2 is a part longitudinal section of the aircraft illustrated in Figure 1, and Figure 3 is an enlarged detailed view illustrating the connection between the wings and the rocking member.

Like references indicate like parts throughout the drawings.

The rocking member comprises two beams 4, located one on each side of the fuselage 5, and secured at 6 to the bell crank 7 which is pivoted at 8 transversely to the fuselage. It will be understood that the rocking member may be of any suitable form, for example it may be constituted by a single beam pivoted to the fuselage. By operating the lever 9 which is normally locked by the ratchet quadrant 10, but which may be released by pressure on the handle 11, the bell crank 7 may be moved about its pivot 8 thus raising or lowering the front end of the rocking member with respect to the fuselage.

The machine is driven by imparting oscillating movement to the rocking member by means of the crank 12 mounted on the shaft 13. The crank shaft 13 may be pedal-driven by the pedals 14 and chain drive 15 as illustrated in Fig. 2. Alternatively the crank shaft may be driven by a suitable motor. A further chain drive 16 may be provided between the crank shaft and landing wheels 17. A clutch (not shown) may be provided for the purpose of interrupting the drive of the wheels when the machine is in the air.

A frame 18 is hinged by fore and aft hinges 19 to each beam 4. The wings 20 are attached to the frames 18 by transverse hinges 21. The frames 18 carry inwardly projecting extensions 22 co-operating with guides 23 which are pivoted to the fuselage at each end on extension pieces 32. The extensions 22 and guides 23 serve to limit the movement of the frames 18 with respect to the rocking member about the hinges 19. It will be understood that the wing 20 is free to rise and fall with respect to the frame 18 by angular movement about the hinges 21 amounting to between 10° and 60°, such angular movement being effected by the pressure of air received above or below the said wings as they rise and fall with the hinged frame. In order to limit the angular movement of the wings about their hinges as aforesaid, a rod 24 is fixed to the rearward portion of each wing by a ball joint 25. The rod 24 is free to slide in a guide 26 secured to the frame 18 by the ball joint 27. Springs 28 secured to the rod serve to absorb shocks due to the beating of the wings about their hinges. The upper end of the rod is provided with a head portion 29 to prevent it slipping through the guide 26.

The operation of the machine is as follows:—

On upward movement of the rocking member about its pivot the angles of the wings will change automatically as the air pressure on the wings will depress their rear edges. As, however, the wings are forced upwards against this air pressure by the upward movement of the rocking member it is clear that the resultant air pressure on the upper surface of the wings will tend to drive the machine forwards. On the downward stroke of the rocking member the air pressure beneath the wings will force them up against the frames 18 which are being moved downwards and which will, after they have been hit by the wings, cause the wings to flap downward again, the cycle of operations being repeated. The wings therefore automatically change their angle of incidence during the early portions of both their upward and downward strokes by a double flapping movement about the hinges 19 and 21.

What I claim as my invention and desire to secure by Letters Patent is:—

1. An aircraft of the ornithopter type comprising in combination a fuselage, a rocking member pivoted at its forward end to the fuselage on an axis extending transversely thereto, wings on opposite sides of the fuselage connected to the rocking member at points spaced away from and to the rear of its pivot and movable with respect to the rocking member about axes extending fore and aft of the aircraft, and means for oscillating the rocking member about its pivot.

2. An aircraft of the ornithopter type comprising in combination a fuselage, a rocking member pivoted at its forward end to the fuselage on an axis extending transversely thereto, frames on opposite sides of the fuselage attached to the rocking member by hinges extending fore and aft of the aircraft, wings pivoted to the said frames on hinges extending transversely of the aircraft, and means for oscillating the rocking member about its pivot.

3. An aircraft of the ornithopter type comprising in combination a fuselage, a rocking member pivoted at its forward end to the fuselage on an axis extending transversely thereto, frames on opposite sides of the fuselage attached to the rocking member by hinges extending fore and aft of the aircraft, wings pivoted to the said frames on hinges extending transversely of the aircraft, means for limiting the movement of the wings and of the frames about their respective hinges, and means for oscillating the rocking member about its pivot.

4. An aircraft of the ornithopter type comprising in combination a fuselage, a rocking member pivoted at its forward end to the fuselage on an axis extending transversely thereto, frames on opposite sides of the fuselage attached to the rocking member by hinges extending fore and aft of the aircraft, guides articulated to the fuselage and co-operating with extensions projecting inwardly from the frames for the purpose of limiting movement of the frames about said hinges, wings pivoted to the said frames on hinges extending transversely of the aircraft, and means for oscillating the rocking member about its pivot.

5. An aircraft of the ornithopter type comprising in combination a fuselage, a rocking member pivoted at its forward end to the fuselage on an axis extending transversely thereto, frames on opposite sides of the fuselage attached to the rocking member by hinges extending fore and aft of the aircraft, wings pivoted to the said frames on hinges extending transversely of the aircraft, guiding members for limiting the movement of the wings about their hinges, attached to the wings at points distant from their hinges and slidably mounted in guides secured to the frames, and means for oscillating the rocking member about its pivot.

6. An aircraft of the ornithopter type comprising in combination a fuselage, a rocking member pivoted at its forward end to the fuselage on an axis extending transversely thereto, frames on opposite sides of the fuselage attached to the rocking member by hinges extending fore and aft of the aircraft, guides articulated to the fuselage and cooperating with extensions projecting inwardly from the frames for the purpose of limiting movement of the frames about said hinges, wings pivoted to the said frames on hinges extending transversely of the aircraft, guiding members for limiting the movement of the wings about their hinges, attached to the wings at points distant from their hinges and slidably mounted in guides secured to the frames, and means for oscillating the rocking member about its pivot.

7. An aircraft of the ornithopter type comprising in combination a fuselage, a rocking member pivoted at its forward end to the fuselage on an axis extending transversely thereto, means for effecting up and down movement of the pivoted end of the rocking member with respect to the fuselage, wings on opposite sides of the fuselage connected to the rocking member at points spaced away from and to the rear of its pivot and movable with respect to the rocking member about axes extending fore and aft of the aircraft, and means for oscillating the rocking member about its pivot.

8. An aircraft of the ornithopter type comprising in combination a fuselage, a rocking member pivoted at its forward end to the fuselage on an axis extending transversely thereto, means for effecting up and down movement of the pivoted end of the rocking member with respect to the fuselage, frames on opposite sides of the fuselage attached to the rocking member by hinges extending fore and aft of the aircraft, wings pivoted to the said frames on hinges extending transversely of the aircraft, and means for oscillating the rocking member about its pivot.

9. An aircraft of the ornithopter type comprising in combination a fuselage, a rocking member pivoted at its forward end to the fuselage on an axis extending transversely thereto, wings on opposite sides of the fuselage connected to the rocking member at points spaced away from and to the rear of its pivot and movable with respect to the rocking member about axes extending fore and aft of the aircraft, a crank connected to the rocking member and means for reciprocating said crank to oscillate the rocking member about its pivot.

10. An aircraft of the ornithopter type comprising in combination a fuselage, a rocking member pivoted at its forward end to the fuselage on an axis extending transversely thereto, wings on opposite sides of the fuselage connected to the rocking member at points spaced away from and to the rear of its pivot and movable with respect to the rocking member about axes extending fore and aft of the aircraft, a crank connected to the rocking member, landing wheels, gearing operatively arranged between the crank and said landing wheels, and means for reciprocating said crank to oscillate the rocking member about its pivot.

11. An aircraft of the ornithopter type comprising in combination a fuselage, a rocking member pivoted at its forward end to the fuselage on an axis extending transversely thereto, means for effecting up and down movement of the pivoted end of the rocking member with respect to the fuselage, frames on opposite sides of the fuselage attached to the rocking member by hinges extending fore and aft of the aircraft, wings pivoted to the said frames on hinges extending transversely of the aircraft, means for limiting the movement of the wings and of the frames about their respective hinges, and means for oscillating the rocking member about its pivot.

12. An aircraft of the ornithopter type comprising in combination a fuselage, a rocking member pivoted at its forward end to the fuselage on an axis extending transversely thereto, means for effecting up and down movement of the pivoted end of the rocking member with respect to the fuselage, frames on opposite sides of the fuselage attached to the rocking member by hinges extending fore and aft of the aircraft, wings pivoted to the said frames on hinges extending transversely of the aircraft, means for limiting the movement of the wings and of the frames about their respective hinges, a crank connected to the rocking member and means for reciprocating said crank to oscillate the rocking member about its pivot.

In witness whereof I have hereunto set my hand.

HENRY JAMES TURNER.